June 22, 1965 E. R. EVANS 3,190,398
SPREADING TYPE DISK BRAKE
Original Filed March 7, 1956 5 Sheets-Sheet 1

INVENTOR.
EDWIN R. EVANS.
BY
Whittemore, Hulbert & Belknap

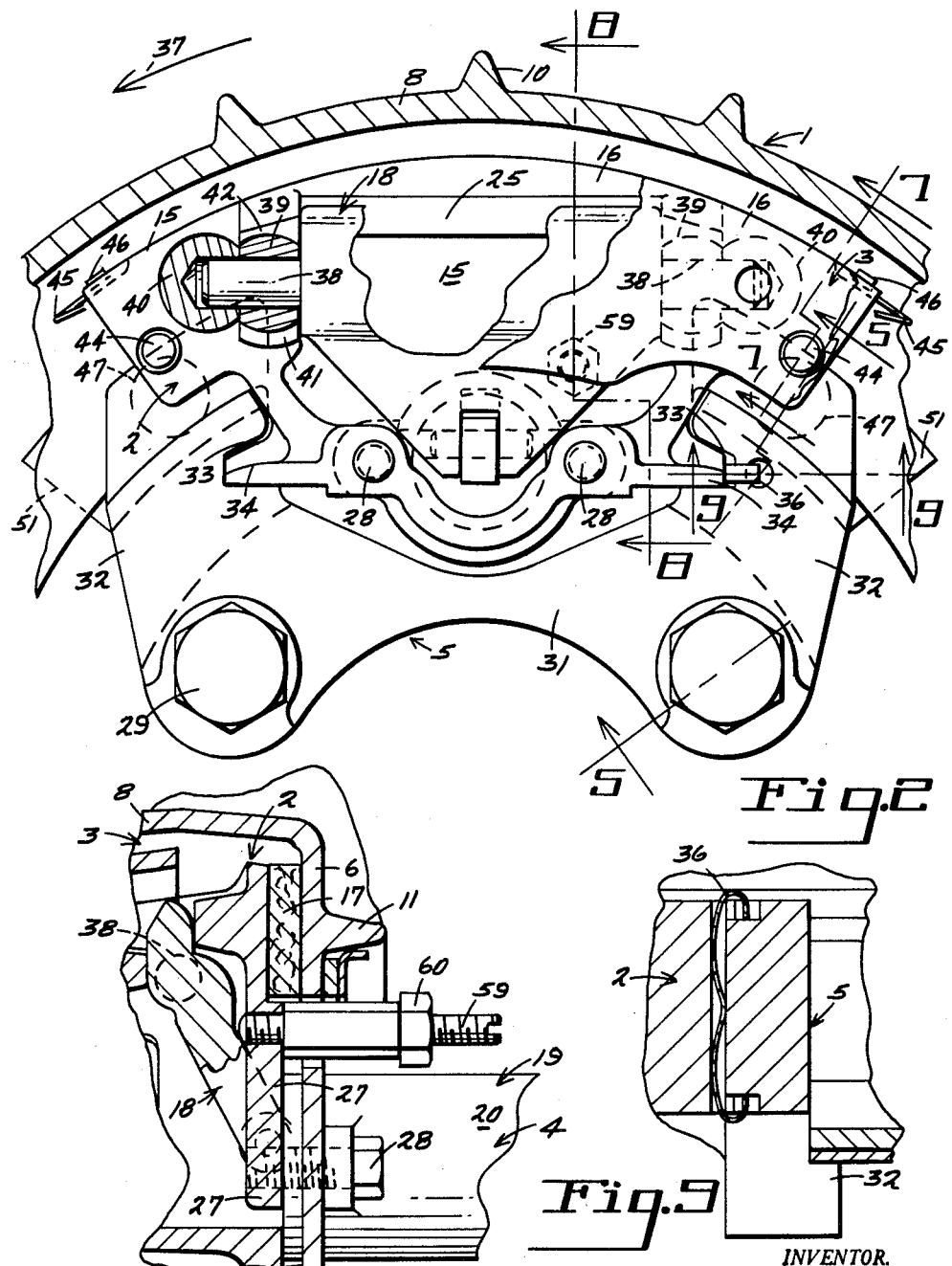

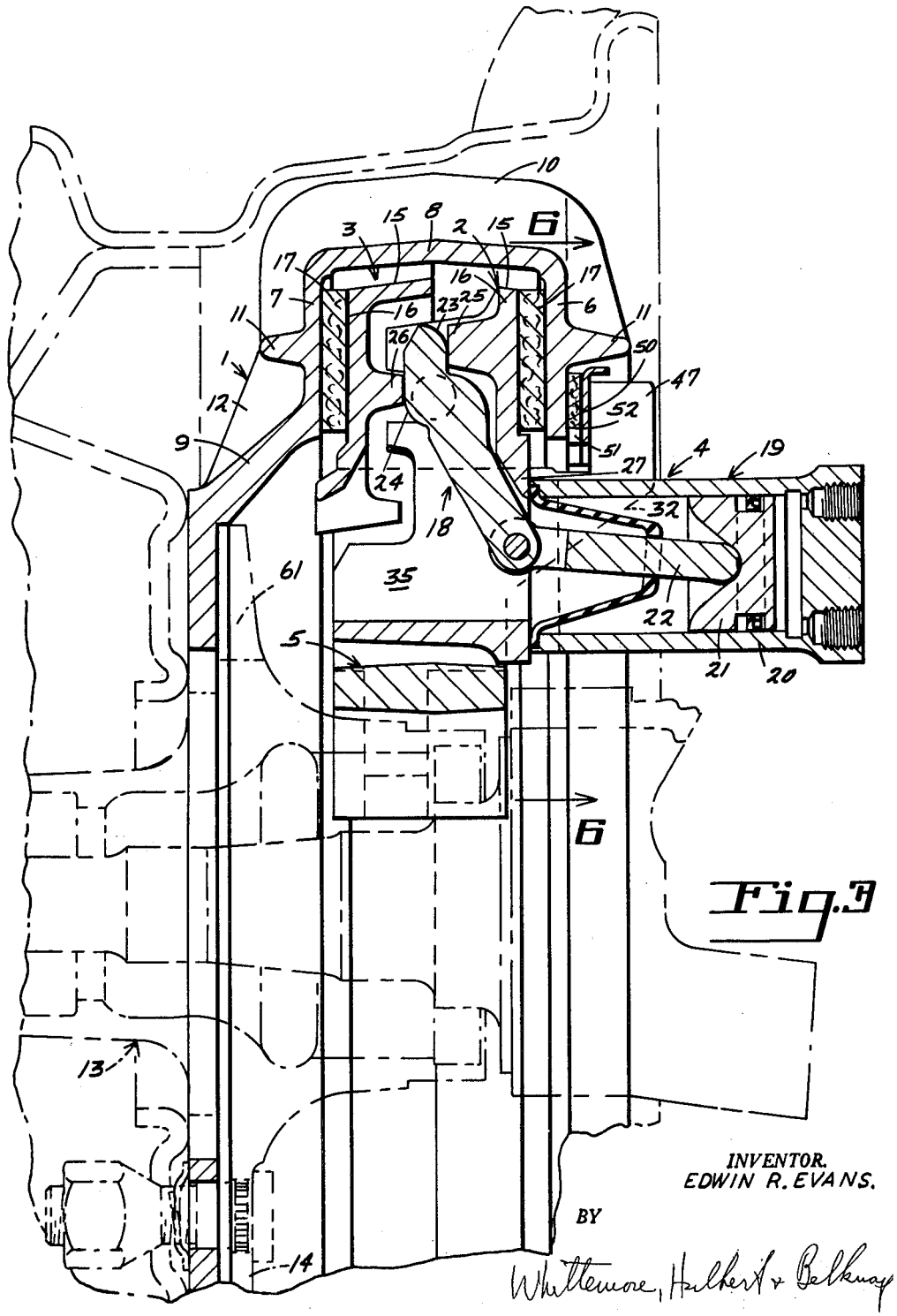

June 22, 1965  E. R. EVANS  3,190,398
SPREADING TYPE DISK BRAKE
Original Filed March 7, 1956  5 Sheets-Sheet 4
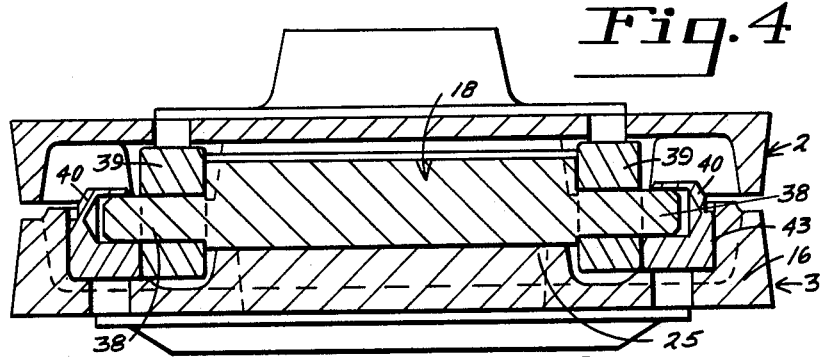
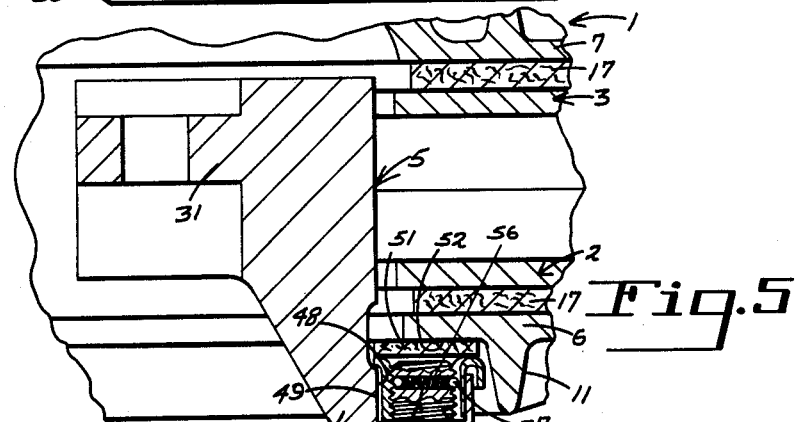
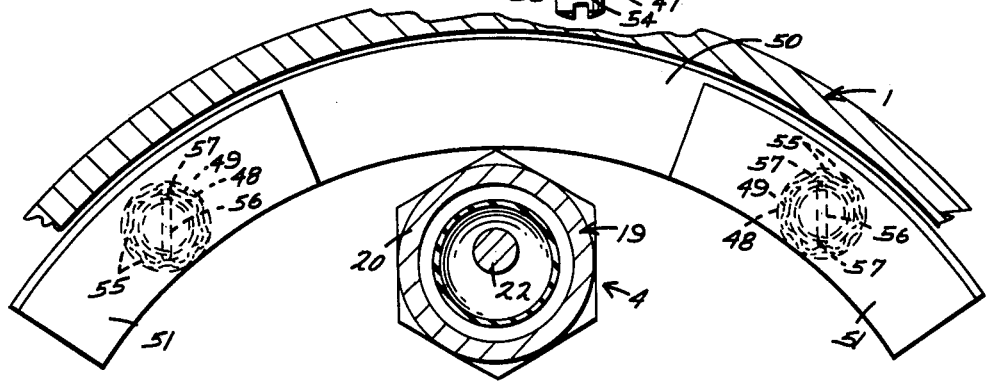
INVENTOR.
EDWIN R. EVANS.
BY
Whittemore, Hulbert & Belknap June 22, 1965   E. R. EVANS   3,190,398
SPREADING TYPE DISK BRAKE Original Filed March 7, 1956   5 Sheets-Sheet 5

INVENTOR.
EDWIN R. EVANS.
BY
Whittemore, Hulbert & Belknap

United States Patent Office 3,190,398
Patented June 22, 1965

3,190,398
SPREADING TYPE DISK BRAKE
Edwin R. Evans, Orchard Lake, Mich.; The Detroit Bank and Trust Company, executor of said Edwin R. Evans, deceased
Original application Mar. 7, 1956, Ser. No. 570,064, now Patent No. 2,999,565, dated Sept. 12, 1961. Divided and this application July 24, 1961, Ser. No. 126,104
3 Claims. (Cl. 188—72)

This is a division of application Serial No. 570,064, filed March 7, 1956, and now Patent No. 2,999,565.

The invention relates to disk brakes and refers more particularly to disk brakes for use with motor vehicle wheels.

The invention has for one of its objects to provide an efficient disk brake, the parts of which are simple in construction and may be cheaply manufactured.

The invention has for another object to provide a disk brake, the parts of which may be readily assembled.

The invention has for still other objects to provide a disk brake comprising a rotatable member, a pair of brake elements engageable with axially spaced disks of the rotatable member and a single anchor for the brake elements; to provide a disk brake in which one brake element is mounted on the anchor and the other of the brake elements is mounted on the first brake element; to provide means for moving the brake elements into engagement with the disks comprising a lever, a fluid pressure cylinder and a piston within the cylinder for moving the lever, the lever and cylinder acting on one brake element and the lever alone acting on the other brake element to move these brake elements away from each other and into engagement with the disks; to provide a disk brake in which the brake elements, lever and anchor are formed to hold the parts from radial movement as well as circumferential movement; and to provide a disk brake in which flexing of the rotatable member upon frictional engagement of its disks by the brake elements is limited to thereby provide for decreasing the weight of the rotatable member without increasing the risk of damaging the rotatable member.

The invention has for further objects to utilize the means for limiting the flexing of the rotatable member as an additional brake element; to so arrange the means for limiting the flexing that it, in effect, forms with the disks and brake elements a triple disk brake; to mount the means for limiting the flexing on the anchor for the brake elements; and to provide a simple self-locking and measuring adjustment means for the means for limiting the flexing.

With these as well as other objects in view, the invention resides in the novel features of construction and combinations and arrangements of parts as more fully hereinafter set forth.

FIGURE 2 is an enlarged view similar to FIGURE 1;

Figure 1:
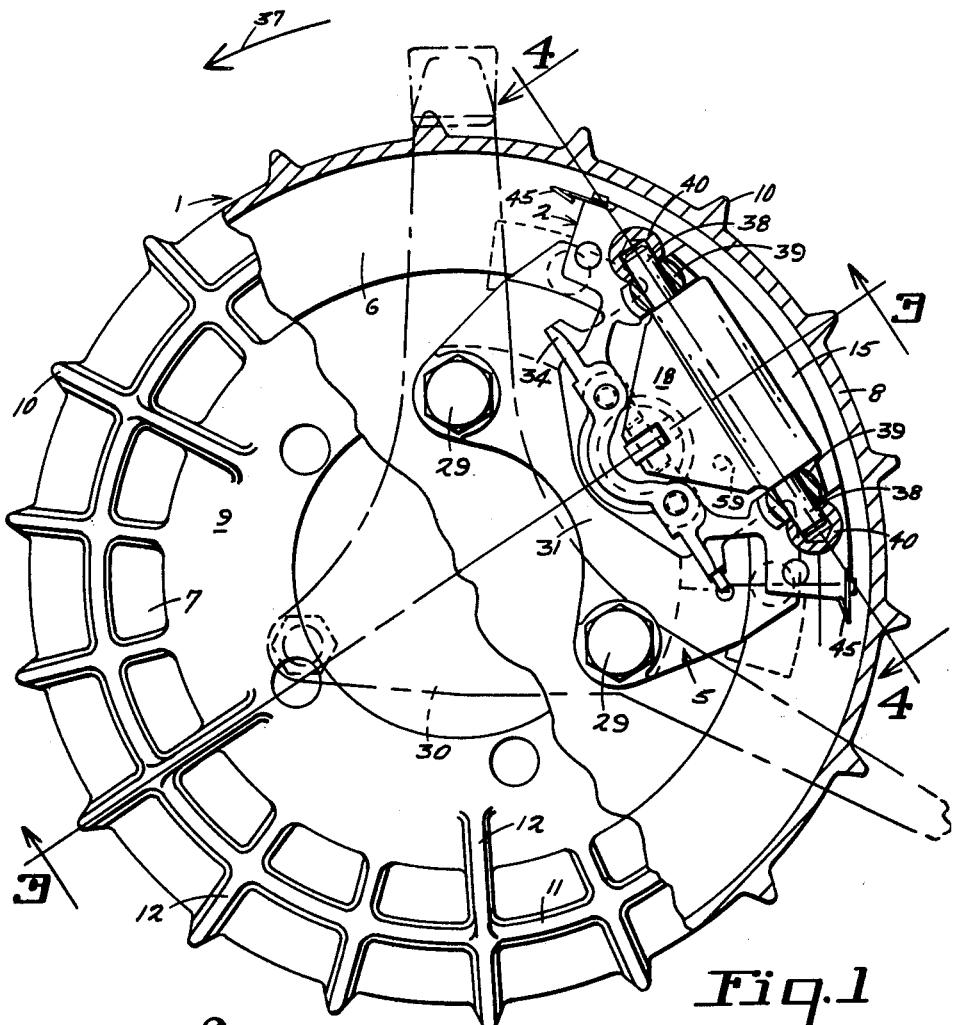
FIGURE 1 is an outboard elevation partly broken away and in section of a brake embodying the invention.
Figure 10:
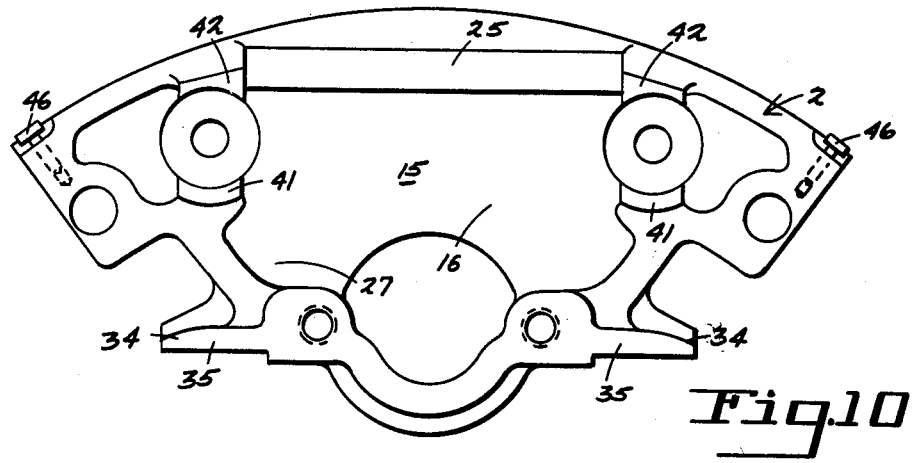
Figure 11:
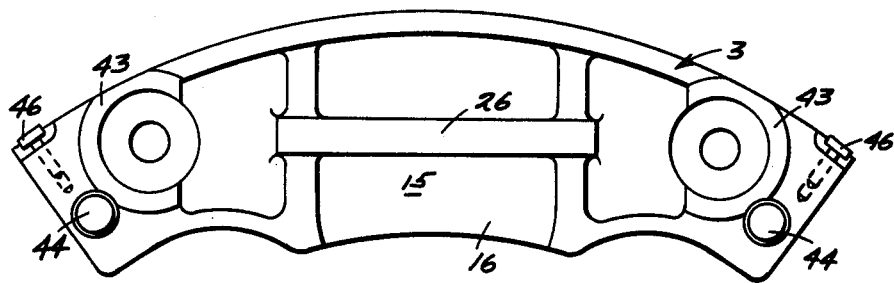
Figure 12:
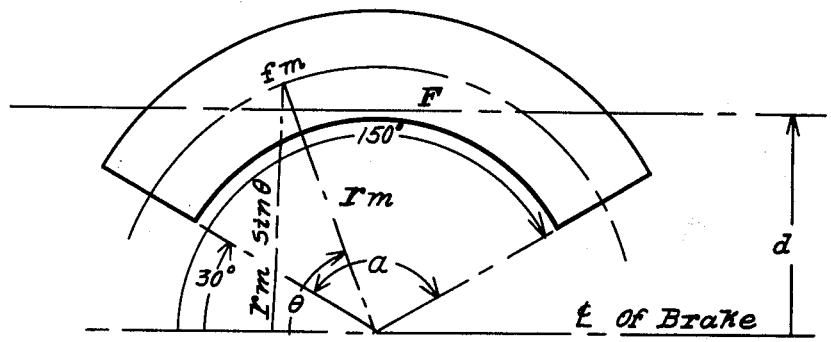

FIGURES 3 and 4 are enlarged cross sections on the lines 3—3 and 4—4 respectively of FIGURE 1;

FIGURES 5, 7, 8 and 9 are cross sections on the lines 5—5, 7—7, 8—8 and 9—9 respectively of FIGURE 2;

FIGURE 6 is a cross section on the line 6—6 of FIGURE 3;

FIGURES 10 and 11 are elevations of opposed surfaces of the inner and outer brake elements respectively;

FIGURE 12 is a digrammatic view illustrating the method of securing the locus on the lining of a brake element on which the brake applying forces are exerted to assure uniform wear of the lining.

The brake illustrated in FIGURES 1 to 12 inclusive is a disk brake for use with a front wheel of a motor vehicle.

The disk brake comprises the rotatable member 1, the inner and outer brake elements 2 and 3, respectively the actuating mechanism 4 for moving the brake elements into engagement with the rotatable member and the anchor 5 for the brake elements.

The rotatable member 1 is a one-piece radially inwardly opening brake drum having the axially spaced inner and outer disks 6 and 7, respectively, providing opposed brake surfaces for the brake elements, the peripheral portion 8 connecting the disks and the web 9 extending generally radially inwardly from the outer disk 7. The brake drum is reinforced by the ribs 10 having axial portions extending radially outwardly from the peripheral portion 8 and radial portions extending axially inwardly and outwardly from the disks 6 and 7 respectively. The brake drum is also reinforced by the annular ribs 11 extending axially inwardly and outwardly from the disks 6 and 7, respectively, and further reinforced by the radial ribs 12 extending axially outwardly from the radially outer portion of the web 9. The brake drum is detachably mounted on a front wheel hub 13 of the motor vehicle by suitably mounting and securing the web 9 on the fixed flange 14 of the wheel hub in a conventional manner.

The inner and outer brake elements 2 and 3, respectively, are friction members which extend within the brake drum between the inner and outer disks 6 and 7 respectively and are engageable with their respective brake surfaces. The inner and outer brake elements have the bodies 15 which are formed with the coextensive generally arcuate portions 16 providing flat surfaces to which are secured the arcuate linings 17 for engaging the brake surfaces of the disks 6 and 7. The arcuate portions and lining are sectors and extend circumferentially of the disks a relatively short distance so that the brake elements are brake shoes.

The actuating mechanism 4 for axially moving the brake shoes away from each other and into frictional engagement with the disks comprises the lever 18 and the fluid pressure operated actuator 19 having the hydraulic cylinder 20, the piston 21, and the piston rod 22. The lever is a plate, preferably formed of steel, extending between the brake shoes 2 and 3 and pivotally connected at its radially inner end to the piston rod 22. The lever has the cam surface 23 and 24 for engaging the reinforcing ribs 25 and 26 of the inner and outer brake shoes 2 and 3 respectively when forcing the brake shoes against their respective disks. The ribs 25 and 26 extend chordwise of the body portions 16 and are integral with the inner and outer brake shoes respectively, the rib 25 being located radially outwardly of the rib 26. The body 15 of the inner brake shoe 2 also has the central portion 27 which extends radially inwardly from the arcuate portion 16 and carries the actuator 19. As shown, the hydraulic cylinder 20 of the actuator is secured by suitable bolts 28 to the central portion and extends axially inwardly through the central opening in the inner disk 6. The piston 21 has a recessed end providing a partly spherical seat for the piston rod 22.

The ribs 25 and 26 extend throughout the major chordwise extent of the bodies 16 and the cam surfaces 23 and 24 extend throughout the width of the lever 18 and are coextensive with the ribs so that the ribs and cam surfaces have extended linear contact. Both the inner and outer brake shoes and the lever are constructed to have great rigidity and the lever serves to increase the rigidity of the shoes so that the brake shoes may be formed of cast iron. The arrangement is such as to provide the maximum lining pressure with the minimum of strain in the assembly and to provide a much desired saving in fluid displacement. Also, surface hardening of the contacting surfaces is unnecessary as proven by the fact that no appreciable wear at the contacting surfaces was found after many thousands of brake applications.

The actuating mechanism presents a closed system in which the hydraulic cylinder 20 and the lever 18, upon entrance of fluid under pressure into the hydraulic cylinder, exerts force in an inboard or axially inner direction upon the central and radially outer arcuate portions 27 and 16 respectively of the inner brake shoe 2 and the lever exerts force in an outboard or axially outer direction upon the outer brake shoe 3 between the radially inner end of the lever and the line of contact of the lever upon the inner brake shoe. Therefore, with a 3 to 1 lever ratio, the effort exerted upon each of the brake shoes forcing the same away from each other and against the disks is four times the pressure exerted by the fluid in the hydraulic cylinder. Furthermore, the pressure exerted upon the outer brake shoe is along the chordal line presented by the rib 26 and the pressure exerted upon the inner brake shoe is equal to and opposite that exerted upon the chordal line of the outer brake shoe. This pressure upon the outer brake shoe 3 along the chordal line presented by the rib 26 is the only brake applying pressure acting on shoe 3 and therefore is the resultant force thereon. The resultant force upon the inner brake shoe 2, which, as indicated, is equal to and opposite that exerted on the outer shoe 3, is the resultant of the two pressures exerted upon the inner shoe, namely, the pressure along the chordal line presented by rib 25 and the pressure of the actuator cylinder 20 upon the central portion 27.

Wear of the lining is a product of pressure times velocity and, for the purpose of equally distributing the lining wear, the line of contact between the rib 26 and the lever 18 must be located so that the product of pressure ($P_1$) and velocity ($V_1$) at one radial side of the line equals the product of pressure ($P_2$) and velocity ($V_2$) at the other radial side of the line, or $P_1 V_1 = P_2 V_2$.

In order to secure this result, the location of the line of contact and, consequently, the location of the chordal rib of the outer brake shoe can be secured by developing a formula as follows:

Given: The inner and outer radii of the lining and the included angle which the lining subtends.
Symbols used:
 $T$—torque, lb. in.
 $F_f$—friction force, lb.
 $F_a$—axial force, lb.
 $r_m$—mean radius, in.
 $f$—coefficient of friction
 $r_i$—inner radius of lining, in.
 $r_o$—outer radius of lining, in.
 $p$—unit pressure, p.s.i.
 $V$—velocity of rubbing
 $K$—constant
 $C$—constant In order that all of the surface will remain in contact the wear in the axial direction must be the same for all values of $r$. Wear is proportional to the work done by friction, which is in turn proportional to the product of the normal pressure and the velocity of rubbing.

Therefore:
$$W = \text{wear} = Kpv = Kpr$$

since the rubbing velocity varies as the radius, $r$.
Then:
$$p = \frac{W}{Kr} = \frac{C}{r}$$

where $C$ is a constant, since $W$ and $K$ are constants:

$$T = F_f r_m = f F_a r_m = \int_{r_i}^{r_o} \frac{2\pi}{3} f p r^2 dr$$

Substituting $p$ for its value $C/r$ $$T = \frac{2\pi}{3} f C \int_{r_i}^{r_o} r \, dr = \frac{2\pi}{3} f C \frac{(r_o^2 - r_i^2)}{2}$$

The total axial force, $$F_a = 2\pi \int_{r_i}^{r_o} p r \, dr = \frac{2\pi C}{3} \int_{r_i}^{r_o} dr = \frac{2\pi C}{3}(r_o - r_i)$$

But:

$$r_m = \frac{T}{fF_a} = \frac{\frac{2\pi f C}{3} \frac{(r_o^2 - r_i^2)}{2}}{f \frac{2\pi C}{3}(r_o - r_i)} = \frac{r_o^2 - r_i^2}{2(r_o - r_i)} = \frac{r_o + r_i}{2}$$

The location of a mean radius is simply one half the sum of the inner and outer radii. This means that if the lever forces can be distributed along the mean radius, uniform wear will result taking into account the increased rubbing velocity toward the outer periphery of the lining. The angle subtended by the circular segment does not effect the mean radius.

Referring to FIGURE 12 of the drawings:
Assume a force, $F$ which when applied at a distance $d$ will be distributed along the mean radius, $r_m$.

$$f_m \frac{\text{force}}{\text{radian}} \text{ and, } \frac{f_m 2\pi}{3} = F$$

Taking moments about the center $$Fd = \int_{\frac{\pi}{6}}^{\frac{5\pi}{6}} f_m r_m \sin \theta \, d\theta = f_m r_m \left( -\cos \frac{5\pi}{6} - \cos \frac{\pi}{6} \right)$$

$$Fd = f_m r_m \sqrt{3} = \frac{3F\sqrt{3}\, r_m}{2\pi}$$

or $$d = \frac{3\sqrt{3}\, r_m}{2\pi}$$

for a 120° circular segment.

The locus upon which the lever forces may be applied so as to insure uniform wear upon a circular segment is therefore, the centroidal axis of the mean radius, $r_m$ which is a circular arc.

The centroidal axis for any circular arc is given by the formula:

$$d = \frac{R \sin \tfrac{1}{2}\alpha}{\tfrac{1}{2}\alpha \text{ in radians}}$$

Where:

$d$ = the distance between the centroidal axis and the center of the circular arc.
$R$ = radius of the circular arc.
$\alpha$ = angle subtended by the circular arc.

For any circular segment the locus upon which the lever forces may be applied so as to assure uniform wear is:

$$d = \frac{r_m \sin \tfrac{1}{2}\alpha}{\tfrac{1}{2}\alpha \text{ in radians}}$$

Where $$r_m = \frac{r_o + r_i}{2}$$

The anchor 5 is a bracket secured, as by means of the bolts 29 to the flange 30 of a conventional front wheel spindle. The anchor bracket serves as a mounting for the inner brake shoe 2 and limits circumferential movement and radial movement but provides for axial movement of this brake shoe. More in detail, the anchor bracket has the body 31 provided with the circumferentially spaced arms 32. The arms are formed with the transverse grooves 33 opening toward each other in a direction chordwise of the brake and these grooves are slidably engaged by the axially extending extensions 34 on the transverse reinforcing flange 35 of the central portion 27 of the inner brake shoe. The extensions extend in opposite directions and chordwise of the brake. To prevent rattle between the inner brake shoe and the anchor bracket, the bowed spring 36 is provided between the bottom of the groove and the associated extension facing in a direction opposite the forward direction of rotation of the brake drum as indicated by the arrow 37 in FIGURES 1 and 2. The ends of the spring are return-bent and engage recesses in the sides of the anchor bracket. The arms and end extension are of material width axially of the brake so that the anchor bracket serves to hold the inner brake shoe from twisting in the brake drum. Also, the construction is such that the bottoms and overhanging parts of the grooves respectively serve to limit circumferential and radial movement of the inner brake shoe.

The lever 18 has the axially aligned pintles 38 at its edges which are journaled in the pair of bearings 39 and the pair of bearings 40. The bearings 39 have radially inner and outer arcuate surfaces of the same radii axially slidably engaging corresponding surfaces of the radially inner and outer flanges 41 and 42 respectively which extend transversely of the body portion 16 of the inner brake shoe 2. The bearings 40 have arcuate surfaces axially slidably engaging arcuate surfaces of the semicircular flanges 43 which extend transversely of the body portion 16 of the outer brake shoe 3 and face or open toward each other. The bearings 39 and 40 are preferably formed from cylindrical rods fashioned to provide flat sides and the bearings are arranged so that the flat sides of the bearings 39 abut the edges of the lever 18 and the flat sides of the bearings 40. The bearings 39 are held from circumferential and radial movement by the transverse flanges 41 and 42. The bearings 40 are held from circumferential and radial movement by the transverse flanges 43. The construction is such that the inner brake shoe 2 supports and holds the lever 18 from circumferential and radial movement and the lever 18 in turn supports and holds the outer brake shoe 3 from circumferential and radial movement and serves to spread apart the two brake shoes.

Figure 7:
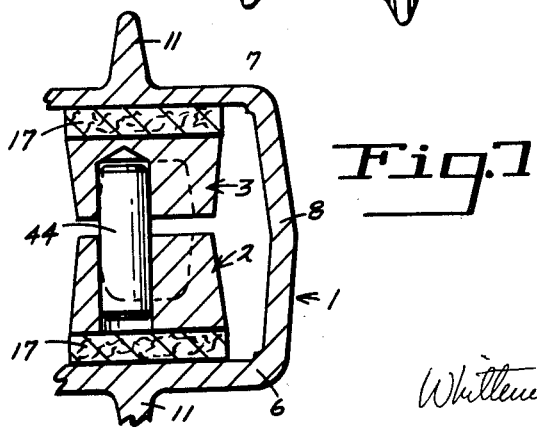

I have also provided the axially extending pins 44 at the ends of the body portions 16 of the brake shoes for assisting in supporting the outer brake shoe 3 on the inner brake shoe 2 and assuring parallel positioning of the outer brake shoe relative to the inner brake shoe during non-braking periods. As shown in FIGURE 7, the pins have a press fit with the body portion of the outer brake shoe and a sliding fit with the body portion of the inner brake shoe.

The two brake shoes 2 and 3 are resiliently urged toward each other and normally held in retracted position by the generally U-shaped wire springs 45 located in recesses in the opposed or facing radially outer corners of the bodies 15 near their end portions. The springs 45 are held in the recesses by the headed projections 46 which in the present instance are headed pins secured to the bodies, the arrangement providing for easy assembly of the springs.

For the purpose of limiting the flexing of the brake drum 1 when the brake shoes 2 and 3 are spread apart and into frictional engagement with the disks 6 and 7 with sufficient force to flex the brake drum, an abutment is provided for engaging the inboard of axially inner side of the inner disk 6. In detail, the anchor bracket 5 has its arms 32 extended axially through the central opening of the inner disk 6 and provided with the integral radially outwardly extending projections 47 formed with the axially outwardly opening cylindrical recesses 48. These recesses receive the cylindrical bosses 49 upon the arcuate stamped backing 50 to which are secured the lining sectors 51 for engaging the surface 52 on the axially inner side of the inner disk 6. The lining sectors, in addition to being operable to limit the flexing of the brake drum, also frictionally engage the inner surface 52 of the inner disk and serve in applying extra braking force to the brake drum when the brake shoes 2 and 3 are forced against the disks 6 and 7 with sufficient force to flex the brake drum. The rib 11 on the axially inner side of the disk 6 encircles the backing 50 and the lining sectors 51 and assists in protecting these parts from dirt and the like.

To axially adjust the lining sectors 51 to provide a predetermined clearance between these sectors and the surface 52, the bosses 49 are internally threaded and engaged by the screws 53 having the stems 54 extending through the bottoms of the recesses 48. The bosses 49 are formed with an odd number of axial corrugations 55 and the screws are formed with the diametral passages 56 in the ends of each of which are the balls 57 resiliently urged outwardly by the coil springs 58. During the turning of the screws, the balls of each screw alternately engage the corrugations and serve to indicate a predetermined increment of adjustment. In other words, the balls and corrugations serve to measure the adjustment of the screws.

To manually adjust the inner and outer brake shoes 2 and 3 with respect to the disks 6 and 7, I have provided the adjustment screw 59 which extends axially through the central opening of the inner disk 6 and threadedly engages the central portion 27 of the inner brake shoe and abuts the lever 18. 60 is a lock nut threaded on the screw and abutting the central portion of the inner brake shoe. Both the screw and nut extend axially inwardly a sufficient distance to be readily turned manually.

With the above construction, the various parts of the brake are simple and may be economically manufactured and also may be readily assembled. During the assembling operation, the anchor bracket 5 is bolted on the flange 30 of the front wheel spindle after which the wheel hub 13 is assembled on the assembly. Also, the hydraulic cylinder 20 is bolted to the inner brake shoe 2 and the inner brake shoe with the hydraulic cylinder in place, the outer brake shoe 3, the pairs of bearings 39 and 40 and the lever 18 connected to the piston rod 22, which bears on the piston 21, are assembled and then secured together by the springs 45 to form a unit. This unit is then inserted within the brake drum 1 with the brake shoes extending between the disks 6 and 7, after which the brake drum with the unit is mounted in place by passing the hydraulic cylinder and the radially inner central portion of the inner brake shoe through the notch 61 of the fixed flange 14 of the wheel hub and through the space between the arms 32 of the anchor bracket 5 and by engaging the extensions 34 of the inner brake shoe with the grooves 33 of the anchor bracket. The brake drum may then be secured to the fixed flange and the lining sectors 51 axially adjusted relative to the axially inner surface 52 of the inner disk 6. This is done by turning the screws 53 to move the lining sectors against the surface and then turning the screws in the opposite direction for a predetermined number of increments as measured by the balls 57 engaging the corrugations 55 to thereby secure a predetermined clearance. Also, the inner and outer brake shoes 2 and 3 may be axially adjusted with respect to the disks 6 and 7 by means of the adjustment screw 59 and if desired the above ball and corrugation feature may be used to secure the desired measured withdrawal adjustment and predetermined clearance. In the event that the disk brake is for use with a rear wheel of a motor vehicle, the anchor 5 is secured to a suitable axle flange at each rear wheel. It is also apparent that the brake shoes 2 and 3 may be formed of some relatively weak material other than cast iron.

What I claim as my invention is:

1. A disk brake comprising a rotatable member having a pair of spaced rotatable disk surfaces, a pair of arcuate brake shoes movable axially toward said disk surfaces, said shoes being in the form of circular segments of limited circumferential extent and having arcuate friction faces respectively engageable with said disk surfaces in response to such movement thereof, said shoes being of a strong rigid construction to resist distortion, force applying means for forcing said shoes axially toward said disk surfaces for pressure engagement of their friction faces with said disk surfaces, said force applying means acting on each shoe so that the resultant force acts along a straight line which coincides with the centroidal axis of the arc of mean radius of the friction face of each shoe so that wear on the friction faces along any radial line is uniform, said centroidal axis being spaced from the center of the arc of the friction face of each shoe a distance equal to $$\frac{R \sin \tfrac{1}{2} a}{\tfrac{1}{2} a \text{ in radians}}$$

where R is one-half the tume of the inner and outer radius of the arcuate friction face thereof, and "$a$" is the angle subtended by the arc, said force applying means including a pivoted lever of a strong, rigid construction to resist distortion, each shoe having an elongated straight bearing surface extending through a substantial portion of the chordwise extent thereof, and said lever having elongated straight cam surfaces coextensive with said bearing surfaces and having extended linear contact therewith.

2. A disk brake comprising a rotatable member having a pair of axially spaced disk members, a pair of arcuate brake shoes movable axially away from each other, said shoes being in the form of circular segments of limited circumferential extent and having arcuate friction faces respectively engageable with said disk members in response to movement away from each other, said shoes being of a strong, rigid construction to resist distortion, force applying means for forcing said shoes axially away from each other for pressure engagement of their friction faces with said disk members, said force applying means acting on each shoe so that the resultant force acts along a straight line which coincides with the centroidal axis of the arc of mean radius of the friction face of each shoe so that wear on the friction faces along any radial line is uniform, said centroidal axis being spaced from the center of the arc of the friction face of each shoe a distance equal to $$\frac{R \sin \tfrac{1}{2} a}{\tfrac{1}{2} a \text{ in radians}}$$

where R is one-half the sum of the inner and outer radius of the arcuate friction face thereof, and "$a$" is the angle subtended by the arc, said force applying means including a lever between said shoes of a strong, rigid construction to resist distortion, each shoe having an elongated straight rib extending through a substantial portion of the chordwise extent thereof, said lever having elongated straight cam surfaces extending throughout the width thereof and coextensive with said ribs and having extended linear contact therewith, an anchor supporting one of said shoes, said lever having aligned pintles extending chordwise of the brake, means pivotally connecting said lever pintles to said anchor-supported shoe for the pivotal support of said lever by said anchor-supported shoe, and means pivotally connecting said lever pintles to the other of said shoes for the support of said other shoe by said lever.

3. A disk brake comprising a rotatable member having a pair of axially spaced disk members, a pair of arcuate brake shoes between said disk members and movable axially away from each other, said shoes being in the form of circular segments of limited circumferential extent and having arcuate friction faces respectively engageable with said disk members in response to movement away from each other, said shoes being of a strong, rigid construction to resist distortion, force applying means for forcing said shoes axially away from each other for pressure engagement of their friction faces with said disk members, said force applying means acting on each shoe so that the resultant force acts along a straight line which coincides with the centroidal axis of the arc of mean radius of the friction face of each shoe so that wear on the friction faces along any radial line is uniform, said centroidal axis being spaced from the center of the arc of the friction face of each shoe a distance equal to $$\frac{R \sin \tfrac{1}{2} a}{\tfrac{1}{2} a \text{ in radians}}$$

where R is one-half of the sum of the inner and outer radius of the arcuate friction face thereof, and "$a$" is the angle subtended by the arc, said force applying means including a lever between said shoes of a strong, rigid construction to resist distortion, said lever being generally radially disposed, each shoe having an elongated straight rib extending through a substantial portion of the chordwise extent thereof, said lever having an elongated straight cam surfaces extending through the width thereof and coextensive with said ribs and having extended linear contact therewith, an anchor supporting one of said shoes, said lever having aligned pintles extending chordwise of the brake, means pivotally connecting said lever pintles to said anchor-supported shoe for the pivotal support of said lever by said anchor-supported shoe, means pivotally connecting said lever pintles to the other of said shoes for the support of said other shoe by said lever, said means pivotally connecting said lever pintles to said respective shoes having axial slidable connection with said respective shoes, permitting relative axial movement between said lever and shoes said force applying means also including a hydraulic piston-cylinder assembly, the cylinder of said assembly being fixed to said anchor-supported shoe, a rod connecting the piston of said assembly to the radially inner end of said lever, said cam surface of said lever which contacts the rib of the anchor-supported shoe being located at the radially outer end of said lever, said pintles and said cam surface of said lever which contacts the rib of said other shoe being located between the radially inner and outer ends of said lever, said rib of said other shoe being disposed on a line coinciding with the centroidal axis thereof.

References Cited by the Examiner
UNITED STATES PATENTS

| | | | |
|---|---|---|---|
| 1,749,745 | 3/30 | Walther | 188—72 |
| 1,936,032 | 11/33 | Ruesenberg | 192—70 |
| 2,045,593 | 6/36 | Frankland | 188—72 |
| 2,302,495 | 11/42 | Freer | 188—72 |
| 2,679,303 | 5/54 | Wright et al. | 188—72 |
| 2,862,580 | 12/58 | Burnett | 188—152 |
| 2,926,757 | 3/60 | Armstrong | 188—152 |
| 2,937,722 | 5/60 | Ruet | 188—152 |

EUGENE G. BOTZ, *Primary Examiner.*

T. GRAHAM CRAVER, ARTHUR L. LA POINT,
*Examiners.*

UNITED STATES PATENT OFFICE
CERTIFICATE OF CORRECTION

Patent No. 3,190,398

June 22, 1965

Edwin R. Evans

It is hereby certified that error appears in the above numbered patent requiring correction and that the said Letters Patent should read as corrected below.

Column 7, line 18, for "tume" read -- sum --; column 8, line 27, strike out "an".

Signed and sealed this 30th day of November 1965.

(SEAL)
Attest:

ERNEST W. SWIDER
Attesting Officer

EDWARD J. BRENNER
Commissioner of Patents